United States Patent [19]

Baily et al.

[11] 3,889,796

[45] June 17, 1975

[54] HARVESTER BOOM CONTROL

[75] Inventors: Everett M. Baily, Moscow, Idaho; Donald E. Rathbone, Manhattan, Kans.; Lynn F. Johnson, Omer Falls, Idaho

[73] Assignee: Idaho Research Foundation, Inc., Moscow, Idaho

[22] Filed: Jan. 24, 1974

[21] Appl. No.: 436,201

[52] U.S. Cl. ............... 198/7; 198/40; 198/121; 214/17 CA; 214/41
[51] Int. Cl. .............................................. B65g 43/00
[58] Field of Search ....... 198/37, 36, 121, 122, 123, 198/125, 40, 113–115, 109, 7 R; 214/6 F, 6 G, 17 CA, 520–522, 41

[56] References Cited
UNITED STATES PATENTS

| | | | |
|---|---|---|---|
| 2,761,578 | 9/1956 | Brownlee et al. | 214/522 X |
| 3,147,846 | 9/1964 | Huntoon | 198/37 UX |
| 3,223,964 | 12/1965 | Stadlin | 198/37 X |
| 3,254,755 | 6/1966 | O'Brien | 214/17 CA X |
| 3,578,146 | 5/1971 | Mehlschau | 214/17 CA X |
| 3,633,879 | 1/1972 | Prichard | 214/522 X |

Primary Examiner—Evon C. Blunk
Assistant Examiner—James M. Slattery
Attorney, Agent, or Firm—Wells, St. John & Roberts

[57] ABSTRACT

A control unit for continuously monitoring and regulating the spacing between a discharge end of a conveyor and the upper surface of a pile for receiving material from the conveyor. An ultrasonic level monitor is utilized to determine the distance between the conveyor discharge end and the upper surface of the pile and to compare that distance with a desired distance. An output signal resulting from a comparison of the two distances is transmitted to a solenoid-operated valve to open or close a hydraulic fluid line to a hydraulic cylinder utilized to raise or lower the conveyor discharge end. The level monitor is thereby capable of continuously maintaining a desired distance between the conveyor discharge end and the upper surface of the pile.

6 Claims, 6 Drawing Figures

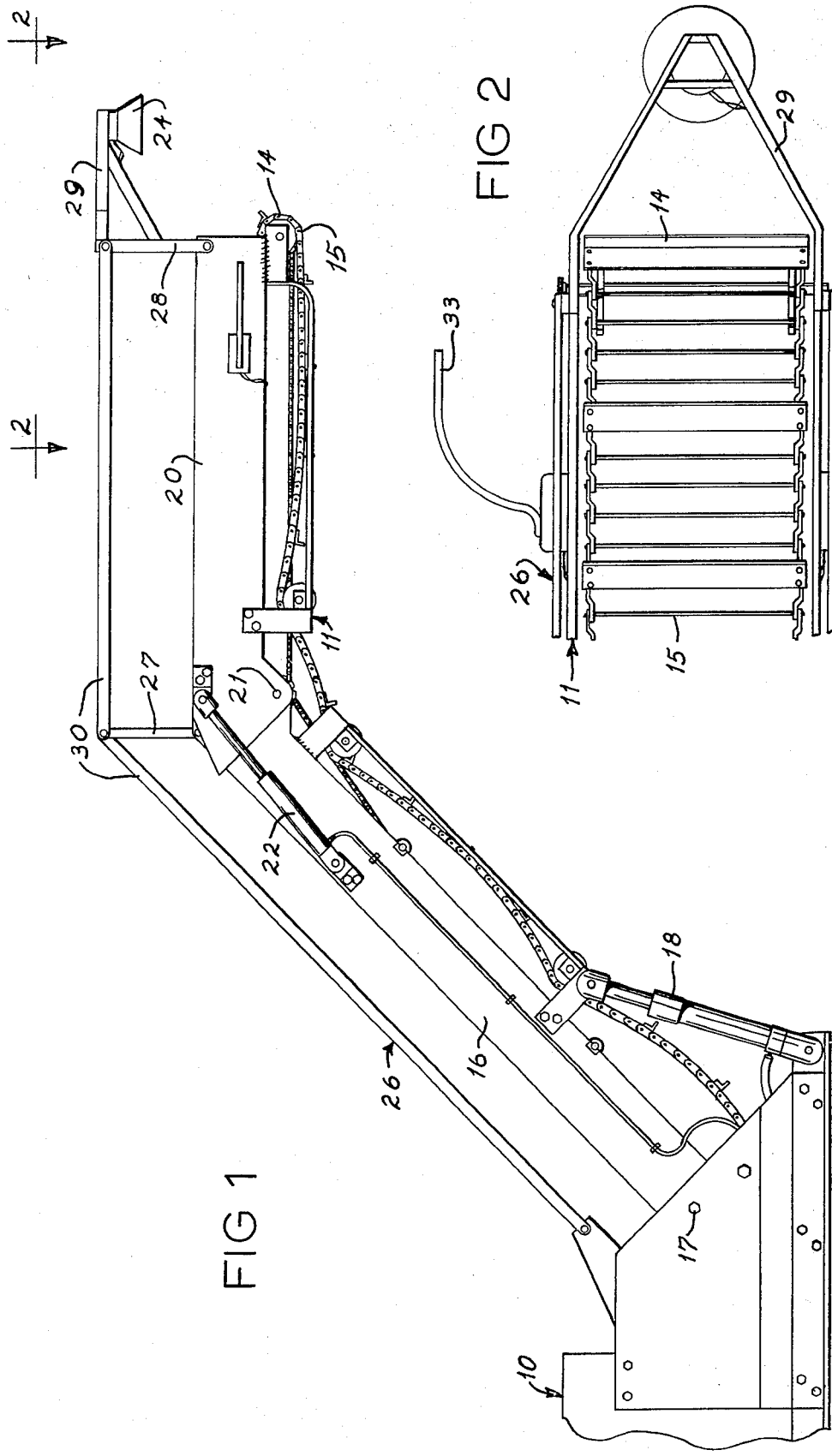

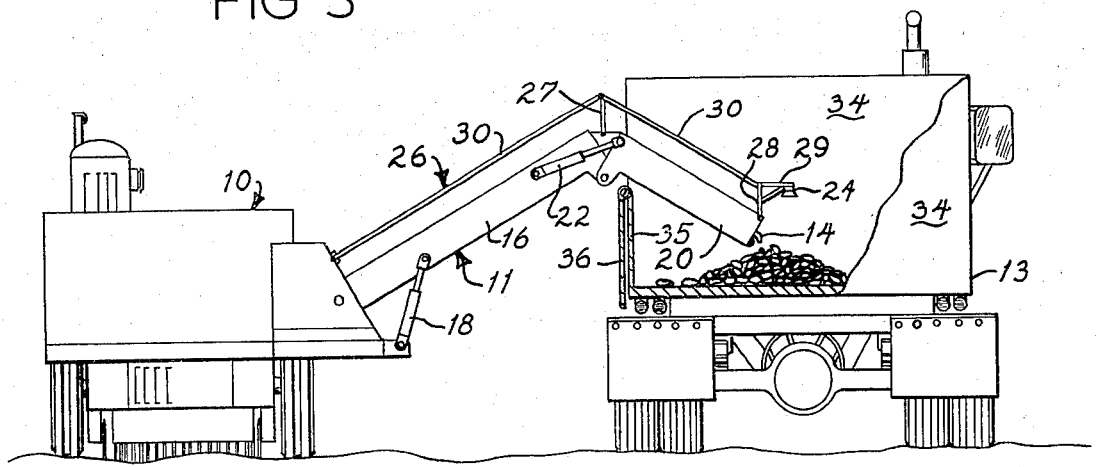
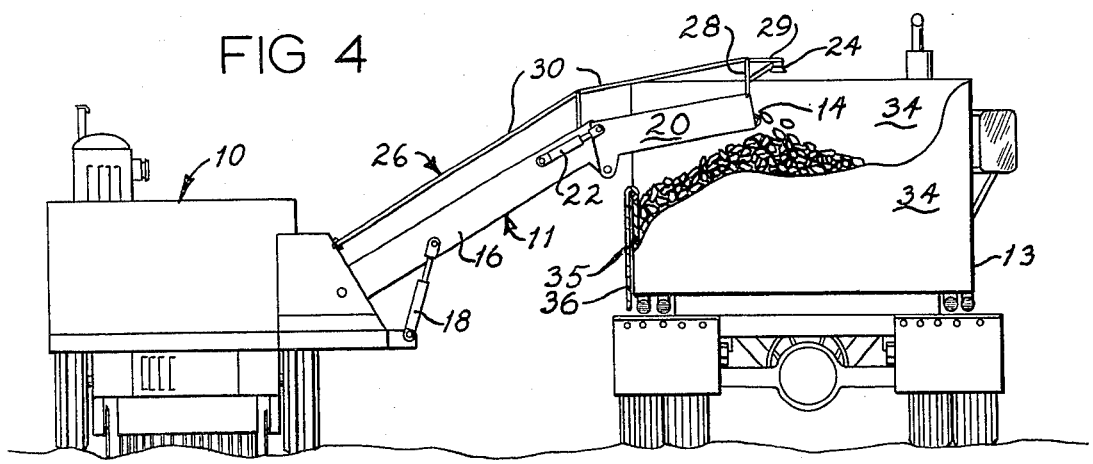
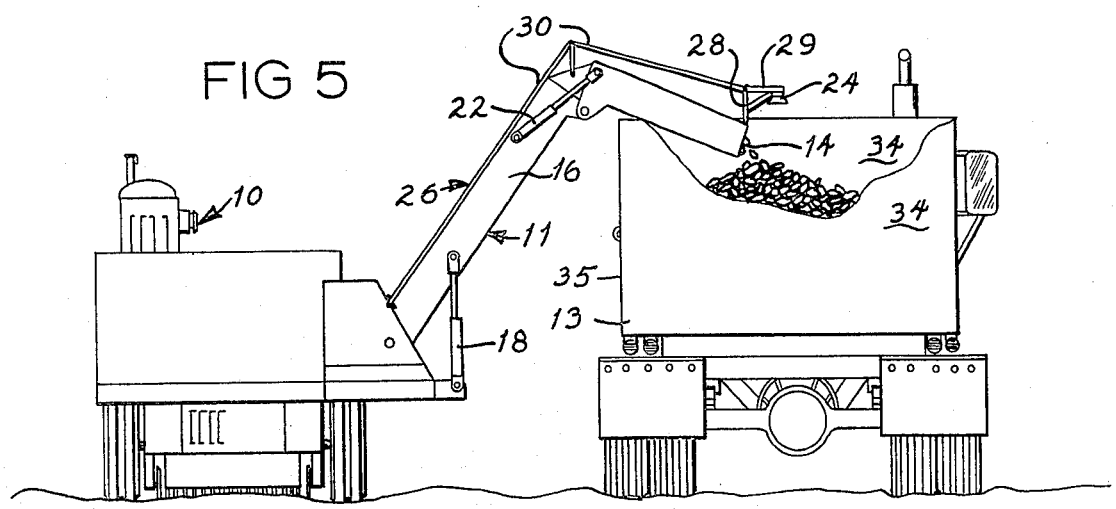

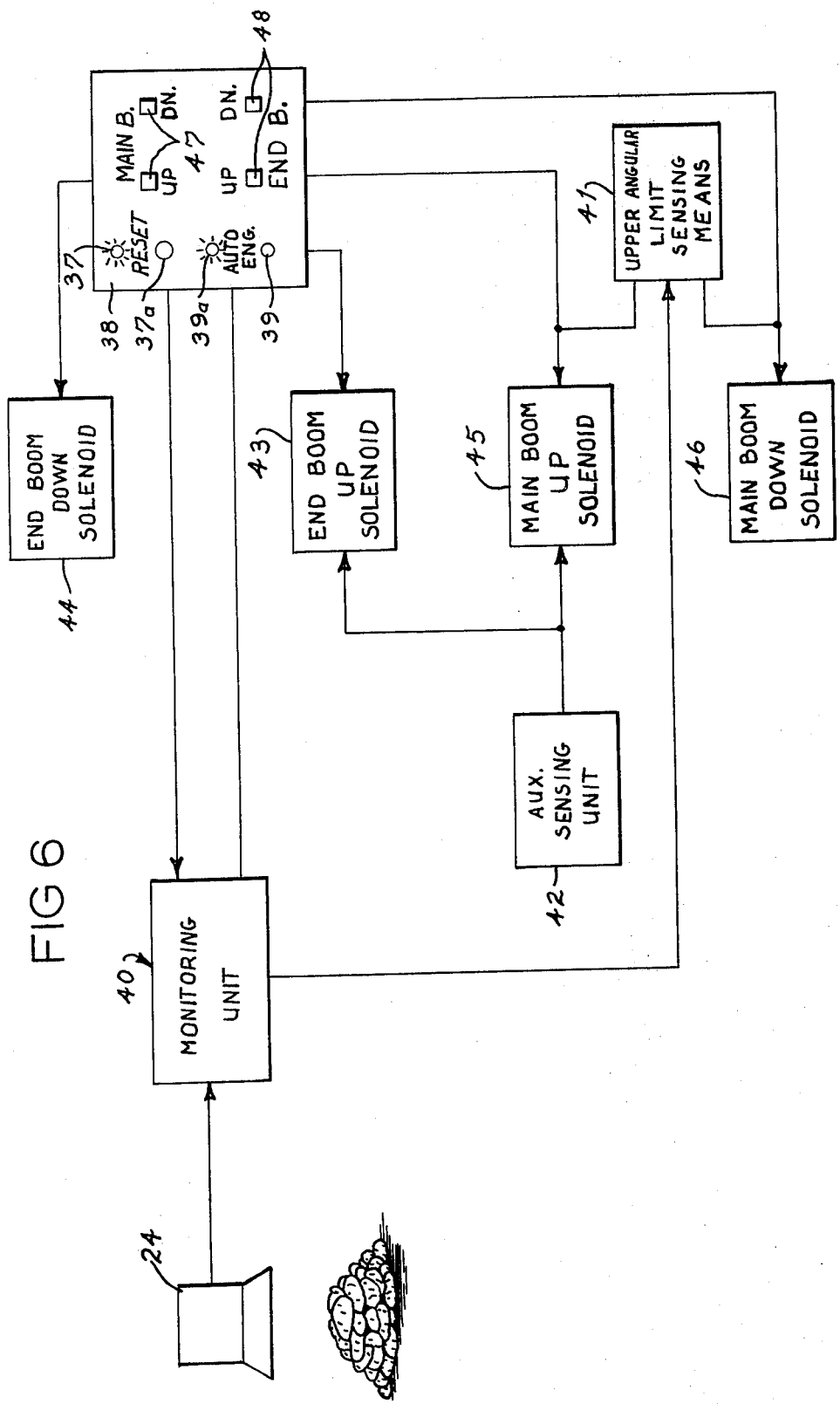

HARVESTER BOOM CONTROL

BACKGROUND OF THE INVENTION

The present invention relates basically to the field of elevation control devices and more particularly to such devices that enable a prescribed distance to be maintained between a moving delivery conveyor and an independently movable receptacle.

It has been found by those in the produce industry, especially the potato industry, that approximately 15 to 25% of bruise damage to a crop during the period between harvesting and shipping is caused as the crop falls gravitationally from the loading boom of the harvesting implement into a truck. This damage can be greatly reduced simply by maintaining the end of the conveyor boom at a prescribed minimum distance from the top surface of the harvested crop in the truck during the loading operation. In present harvesting implements, this is accomplished by the implement operator who utilizes manual controls to operate the conveyor boom in an effort to maintain the desired distance. Such manual operation of the conveyor boom is an extremely difficult task since the level of the delivered material is continuously changing and the terrain between the harvesting implement and the truck receiving the material may be such that abrupt elevational changes may suddenly occur between the two vehicles. It may therefore be understood that in order to maintain a desired spacing, the operator must continuously observe and control the elevation of the discharge end of the conveyor boom. This is a nearly impossible task since the operator must also attend to and adjust the operating speed of material handling conveyors other than the delivery boom conveyor, and he must also steer and control the speed of the tractor pulling the harvesting implement.

An ultrasonic apparatus for measuring the height of material in a stationary bin or hopper is disclosed in a prior U.S. Pat. granted to Stadlin, No. 3,223,964. The Stadlin system is concerned with the monitoring of a material level in a stationary bin followed by on/off control of material delivery to the bin as a specified level is arrived at or exceeded. This system not only utilizes a stationary bin, but also utilizes a relatively stationary delivery conveyor. It is not concerned with varying the distance through which the incoming material must drop.

Other U.S. Pats., specifically Nos. 3,147,846 granted to Huntoon, No. 3,254,755 to O'Brien and 3,578,146 to Mehlschau, disclose conveyor booms that are vertically movable to minimize the drop damage to an agricultural crop. These patents disclose mechanical sensing devices which detect the height of the material in a bin and adjust the elevation of the delivery conveyor accordingly. Each apparatus is intended to operate in relation to a produce bin which remains stationary and which can be filled from a single plane. With such arrangements, the control for the conveyors can be accomplished with a simple regulator system wherein actuation of a mechanical level sensor produces a short upward movement of the delivery conveyor. While these systems are serviceable, they will not function in an efficient manner when required to control a vertically movable loading boom and an independently moving bin into which the material from the boom is to be delivered.

The apparatus of the present invention is designed to enable continuous control of a material delivery conveyor boom at a desired level above the top surface of the material being delivered, with the material being received in an independently movable receptacle, such as a truck bin. More specifically, the control is intended for use with boom conveyors having two independently pivotable sections—a main boom section pivoted to the harvesting implement and an end boom section pivotably connected to the main boom section. To provide efficient control of such conveyor booms, the device has incorporated various sensing means for detecting the relative angle between the two boom sections as well as controlling the delivery end of the end boom section relative to the top surface of the material being loaded into the receptacle.

SUMMARY OF THE INVENTION

A control for a conveyor is disclosed for controlling the distance between an upper surface of a receiving pile and a discharge end of the conveyor which is pivotably movable about a horizontal axis. The control includes an ultrasonic transducer monitoring means that is continuously operated to monitor the separation between the discharge end of the conveyor and the upper surface in order to produce an output signal indicating that the spacing is greater or less than a desired distance. An output signal translating means is provided to receive the output signal from the transducer monitoring means and to operate a drive means to raise or lower the conveyor boom to continuously maintain the desired distance between the conveyor discharge end and the upper surface of the receiving pile.

It is a primary object of the present invention to produce a harvester boom control that will substantially reduce bruise damage caused by the drop distance from a conveyor discharge to the surface of a load, by effectively maintaining a desired distance between the delivery end of the conveyor and the upper surface of the load.

Another important object of the present invention is to provide such a control that is automatically operable to afford the implement operator more time to attend to other important operations of the implement.

It is a further object to provide such a control that is efficiently operable to maintain a prescribed distance from the delivery end of the conveyor boom and the upper surface of the receiving pile when both the harvesting implement and the truck receiving the material are moving independently of one another.

It is a yet further object to provide such a control that provides a manual override to enable selective control of the conveyor boom by the operator.

These and other objects and advantages will become evident upon reading the following description which, taken with the accompanying drawings, discloses a preferred form of the invention.

A BRIEF DESCRIPTION OF THE DRAWINGS

A preferred form of the present invention is illustrated in the accompanying drawings in which:

FIG. 1 is a fragmentary elevational view of a boom conveyor with the control apparatus mounted thereto;

FIG. 2 is a fragmentary plan view taken substantially along line 2—2 in FIG. 1;

FIG. 3 is an operational view illustrating the relative position of the conveyor boom and the material being delivered to a truck;

FIG. 4 is an operational view similar to FIG. 3 only illustrating a different position of the boom relative to the truck and the material held therein;

FIG. 5 is an operational view similar to FIGS. 3 and 4, showing an additional relative position of the conveyor boom to a truck; and FIG. 6 is a block diagram basically illustrating the control units utilized in the operation of the present invention.

DETAILED DESCRIPTION OF A PREFERRED EMBODIMENT

Referring now in detail to FIGS. 1 and 3–5, the apparatus of the present invention is illustrated in conjunction with a harvesting implement generally designated by the reference numeral 10. Implement 10, as shown, is specifically utilized in harvesting potato crops by successively digging the potatoes and moving them along a series of conveyors in order to remove dirt clods and other foreign material. The potatoes are discharged by a boom conveyor 11. The boom conveyor 11 is utilized to deliver potatoes from the implement to a truck bed 13 or other mobile receptacle.

A potato producer concerned about the quality of his crop is very careful to handle the crop as gently as possible to avoid bruise damage that would eventually result in lower selling prices. The boom conveyor 11 often includes conveyor chains 15 padded with a spongy material to avoid damaging the crop as it moves along the conveyor to the delivery truck. Any damage incurred at the discharge end 14 of the conveyor 11 as potatoes drop into truck bed 13, is very undesirable.

To prevent damage to the produce as it falls from the delivery end 14 of conveyor 11, the conveyor boom is articulated at two points dividing the boom into a main boom section 16 adjacent implement 10, and an end boom 20 pivotably mounted to the main boom section 16. Main boom 16 is mounted to the implement for pivotal movement about the horizontal axis of a pivot 17 and is powered to pivot about that axis by means of a double acting hydraulic cylinder 18. The end boom 20 is connected to the main boom 16 about the axis of a pivot 21 having an axis parallel to the axis of pivot 17. The end boom is pivoted by means of another double acting hydraulic cyclinder 22. The apparatus of the present invention is utilized to control operation of the hydraulic cylinders 18 and 22 to maintain a prescribed distance between the conveyor discharge end 14 and the upper surface of the pile of material on the truck bed 13.

An ultrasonic transducer monitoring means 40 (FIG. 6) is utilized by the present invention to automatically control pivotal movement of discharge end 14 in order to maintain a desired spacing between the discharge end and the upper surface of the receiving pile. The monitoring means 40 includes an ultrasonic transducer 24, mounted on conveyor 11 adjacent discharge end 14. Transducer 24 is operated to continuously produce ultrasonic pulsations and to direct the pulsations toward a portion of the upper surface of the receiving pile directly below discharge end 14. A portion of the pulsed ultrasonic energy is reflected back from the surface and is received by the transducer 24. The total elapsed time is measured from the instant each pulse is emitted to the instant the reflected sound energy is received. The measured time is proportional to the actual linear distance between the transducer 24 and the upper surface of the receiving pile from which the pulsation was reflected.

Monitoring means 40 includes provisions for comparing the actual total elapsed time, as described above, with a reference time. The reference time represents the length of time required for a signal to cover a desired distance between the upper surface of the receiving pile and the transducer. If the actual total elapsed time is greater or less than the reference time, a corresponding output signal is produced and directed to an output signal translating means.

In the preferred form of the present invention the output signal translating means comprises a number of solenoid valves 43–46 (FIG. 6). If the actual elapsed time is greater than the reference time, an end boom solenoid 44 is activated to operate cylinder 22 to extend, pivoting the discharge end 14 toward the upper surface of the receiving pile. Also, if the actual total elapsed time is less than the reference time, a corresponding output signal is produced that activates another end boom solenoid 43. Solenoid 43 allows hydraulic fluid to flow to the double acting cylinder 22, forcing it to retract, and thereby pivot the delivery end 14 upwardly away from the upper surface of the receiving pile.

In order to assure proper angular orientation of the transducer regardless of the relative angle of the end boom 20, a parallelogram linkage 26 is utilized. The linkage comprises a first radius bar 27 mounted at the juncture of the main boom 16 and end boom 20, and a second radius bar 28 located at the discharge end 14. The radius bars 27 and 28 are interconnected to the frame of the implement 10 by elongated bar members 30. The transducer 24 is mounted to the second radius bar by means of a support frame 29. As the end boom and main boom are pivoted relative to one another, transducer 24 will remain at a stationary angle relative to a vertical plane. By providing such an arrangement, it is possible to utilize transducer 24 to detect the highest point of the material level directly below the discharge end 14.

The independently articulated boom sections 16 and 20 enable the operator to position the end boom 20 adjacent the truck bed 13 to enable delivery of material directly to the surface of the bed. To further assist the positioning of the discharge end 14 adjacent to the truck bed 13, one side wall 35 of the truck is hinged along a horizontal axis to allow a top wall section 36 to be swung downwardly, providing access for the conveyor at a lower elevation (FIG. 3). Once the level of the delivered material has reached the elevation of the hinge (FIG. 4), the wall section 36 may be pivoted upwardly and latched (FIG. 5) to enable the remaining area to be filled.

This procedure necessitates movement of the main boom 16 between a lowered position (FIG. 3) and a raised position (FIG. 5). In operation, the main boom 16 is first moved to the lowered position and the end boom 20 is then lowered to bring the discharge end 14 close to the truck bed 13. As the material level grows, the end boom 20 is automatically raised by operation of the control until an approximate dead center position is arrived at, wherein the end boom 20 is coextensive with the main boom 16. This position is illustrated in FIG. 4. Once the end boom 20 reaches this position, the main boom 16 must be elevated to the upper position or to a position intermediate the upper and lower positions while the end boom 20 is maintained at the prescribed distance from the material surface. This movement is automatically accomplished by the present invention which provides a sensing means 41 (FIG. 6) for detecting upper and lower angular limits of the end boom 20 relative to the main boom 16. The sensing means is operable to actuate the cylinder 18 to raise the main boom 16 as the end boom 20 reaches the upper angular limit and to lower the main boom 16 as the end boom 20 approaches the lower angular limit.

The sensing means 41 may comprise a simple detector switch located between the main boom and end boom or it may be included as a unit controlled by the transducer monitoring means. When utilized in combination with the monitoring means, the sensing means may operate in response to the flow of hydraulic fluid to the double acting cylinder 22. Thus, when cylinder 22 has reached a fully retracted position, (FIG. 4) no fluid will continue to flow through solenoid valve 43 to that cylinder, despite demand from the monitoring means. The sensing means may detect this situation and in response, operate the cylinder 18 to pivot the main boom 16 upwardly. Likewise, if the cylinder 22 were fully extended, there could be no flow of hydraulic fluid through solenoid valve 44 to the cylinder, despite demand signals from the monitoring means. Sensing means 41 may detect such a condition and in response, operate the main boom cylinder 18 to pivot downwardly.

It may be understood that the operation of the control to maintain the preferred distance between the discharge end 14 and the surface of the material is not necessarily interrupted from the simultaneous operation of the main boom 16 as it moves between its upper and lower angular positions. Therefore, it is possible that hinged section 36 of the side wall 35 may be moved upward or downwardly without necessitating readjustment of the delivery end 14 of end boom 20 relative to the material surface.

FIG. 2 illustrates an auxiliary sensing unit 42 that is operable to detect impending lateral collision of the discharge end 14 with either a forward or rearward end wall 34 of the truck bed 13. The auxiliary sensing means 42 diagrammatically illustrated in FIG. 6, is operatively connected to both the main boom cylinder 18 and the end boom cylinder 22. Once one of the two opposed feeler bars 33 is engaged by any relatively stationary surface, the cylinders 18 and 22 are automatically activated to raise the conveyor 11 to an elevation sufficient to clear the obstruction. When activated, the sensing unit 42 automatically disengages both automatic and manual control for both cylinders.

A control panel 38 (FIG. 6) is provided to enable the operator to manually disengage or override the transducer and monitor unit so he may selectively control the elevation of the conveyor 11 manually. This feature is provided for emergency purposes and for enabling positioning of the boom once a truck has been loaded. It is also used when the implement reaches a point where it must be turned around to start harvesting a new row.

Automatic control of the end boom 20 is disengaged upon actuation of end boom manual controls. Manual operation of the main boom does not alter automatic operation of the end boom. In order to re-engage automatic control of both booms, after manual control of end boom 20, an "auto engage" button 39 is provided on control panel 38, accompanied by an auto indicator lamp 39a for indicating on or off modes of the automatic control system. Manual boom controls include up and down switches 47 for controlling the main boom, and separate up, down switches 48 permitting manual control of the end boom. An additional feature of the control panel 38 is the provision for a flashing lateral contact alarm lamp 37 which indicates operation of the auxiliary sensing unit 42 and revert the system to manual control.

Operation of the present invention may now be easily understood from the above description and with reference to FIGS. 3-6.

Transducer 24, when engaged by the operator, emits ultrasonic pulses that are directed toward the surface of the material being delivered by conveyor 11 to the truck bed 13. Portions of the pulses are reflected from the material surface and are received by the transducer. The total elapsed time of each pulse during transit to and from the transducer is measured. This measure is compared, within the monitoring unit, to a reference measure that would normally be received if the transducer were located at a desired vertical distance from the surface of the receiving pile, solenoid valve 43 is activated to operate the cylinder 22 to raise the end boom 20. If the input signal indicates the discharge end 14 is too far above the material surface, solenoid valve 44 is activated to operate cylinder 22 to lower the end boom 20. The amount of movement of boom section 20 is governed by the monitoring unit in response to the input signals to automatically maintain a desired vertical distance between the discharge end 14 and the material surface.

As the upper surface level of pile being formed within the truck bed continues to raise, so must the discharge end 14. Therefore, when the end boom 20 reaches an angular position wherein the cylinder 22 is fully retracted (FIG. 4), sensing means 41 detects the situation and automatically activates solenoid valve 45 to raise the main boom 16. Monitoring unit 40 is continuously operating during this time, so that as the main boom 16 is elevated, the end boom is automatically pivoted downwardly (relative to the main boom) to maintain the desired spacing between the material surface and discharge end 14. This process is repeated in reverse as the cylinder 22 becomes fully extended. In this situation, sensing means 41 sends a signal to solenoid valve 46 in order to operate cylinder 18 to lower the main boom 16.

The auxiliary sensing unit 42 is provided to automatically prevent damage to the conveyor 11 that is frequently incurred when the implement 10 and truck are moving at different speeds while loading. The feeler bars 33 detect such an impending collision between the conveyor 11 and a truck bed end wall 34. Solenoids 43 and 45 are automatically activated by unit 42 to operate cylinders 18 and 22 to raise both the main and end boom sections 16, 20 to fully clear the obstruction. The auxiliary sensing unit 42 is designed to override and disengage the control operation of the monitoring unit only if an end wall 34 or other relatively stationary object is encountered by a feeler bar 33.

It may have become obvious from the above description and the attached drawings that various changes

What we claim is:

1. A control for a boom conveyor adapted to be pivoted about a horizontal axis and including a discharge end spaced from said axis for delivering material from said discharge end downward onto a receiving pile in a receptacle, comprising:

ultrasonic transducer means pivotally mounted at the discharge end of the conveyor boom for continuously monitoring the spacing between the discharge end and the upper surface of the receiving pile and for producing an output signal indicating the spacing between the discharge end and the upper surface of the pile;

drive means for raising or lowering the discharge end of the conveyor relative to the surface of said receiving pile;

output signal translating means operatively connecting said ultrasonic transducer means and said drive means, said output signal translating means being responsive to said output signal of the ultrasonic transducer means for operating said drive means to continuously maintain the spacing between the discharge end and the upper surface of said receiving pile at a preselected distance; and means operatively interconnecting the ultrasonic transducer means and the boom conveyor for pivoting the ultrasonic transducer means in response to pivotal movement of the boom conveyor to maintain the ultrasonic transducer means directed toward the upper surface of the pile independently of the angular orientation of the boom conveyor.

2. The boom control set out in claim 1 further comprising manual override control means for enabling a user to manually control the operation of the output signal translating means.

3. A boom control for a mobile crop harvesting implement having a boom conveyor for delivering harvested material from the implement to an independently mobile receptacle such as a truck bed, said boom conveyor including:

a main boom section mounted at one end thereof to the implement for pivotable movement about a horizontal axis thereon;

an end boom section pivotably mounted to the remaining end of said main boom for pivotal movement about a pivot axis thereon parallel to said horizontal axis;

first power means connected between the implement and the main boom section for operating the main boom section to pivot about said horizontal axis;

and second power means connected between the main boom and the end boom for operating the end boom to pivot about said pivot axis between prescribed upper and lower angular limits relative to said main boom section;

said boom control comprising:

an ultrasonic monitoring means for continuously monitoring the distance between a discharge end of said end boom section and the upper surface of a material receiving pile below said discharge end, and for producing an output signal indicating the spacing between the discharge end and the upper surface of the pile;

output signal translating means responsive to said output signal for selectively operating said second power means to continuously maintain the spacing between said discharge end and said upper surface at a preselected distance; and sensing means operatively interconnecting said main boom section and said end boom section for detecting angular movement of said end boom section at said upper and lower angular limits and operable to actuate said first power means to pivot the main boom section upwardly when the end boom section has reached the upper angular limit and to pivot the main boom section downwardly when the end boom section has reached the lower angular limit.

4. The boom control set out in claim 3 further comprising manual override control means for enabling a user to manually control the operation of the output signal translating means and said sensing means.

5. The boom control set out in claim 3 wherein the ultrasonic level monitoring means includes an ultrasonic transducer mounted at the discharge end of the conveyor boom and positioning means operatively interconnecting the ultrasonic transducer and the end boom section for pivoting the ultrasonic transducer in response to pivotal movement of the end boom section to maintain the ultrasonic transducer directed toward said upper surface at the pile independently of the angular orientation of the end boom section.

6. The boom control set out in claim 3 further comprising auxiliary sensing means for detecting impending lateral contact of said end boom section with a relatively stationary object such as an upright end wall of a truck bed, and automatically operating said first and second power means to pivot said main boom and end boom sections upwardly clear of the object.

* * * * *